Patented May 26, 1931

1,806,965

UNITED STATES PATENT OFFICE

JOHN H. CLEWELL, OF ARLINGTON, NEW JERSEY, ASSIGNOR TO DU PONT VISCOLOID COMPANY, OF WILMINGTON, DELAWARE, A CORPORATION OF DELAWARE

INK FOR CELLULOSE ESTERS

No Drawing.  Application filed April 12, 1928.  Serial No. 269,595.

This invention relates to chemical inks, and particularly to ink for marking and printing on cellulose ester bodies, as cellulose ester plastics and films having cellulose nitrate or cellulose acetate as a base. Although not restricted thereto, it finds particularly valuable use in the application of indicia, e. g. footage numbers, to motion picture film, especially in those cases where the indicia are to be applied by an automatic numbering machine.

A major object of the invention is to provide an ink which, when applied, will remain permanent against abrasion and the attack of photographic developing and washing fluids, and will not have a deleterious effect on the sensitized photographic emulsion, either by contact therewith or by emanation from the ink. It is a further object to provide an ink which will dry rapidly on the ester body but yet will print clearly without blurring and will not gum on the type, and which will be at least partially absorbed into the ester body, but, in the case of motion picture film, will not shrink the perforations. To these ends and also to improve generally upon inks of the character indicated, the invention consists in the various matters hereinafter described and claimed.

Without restricting the invention thereto, the following will serve as an example of an ink in accordance with the present invention, such ink having the above indicated, and other, desirable characteristics and being usable for cellulose nitrate and cellulose acetate bodies:—

|  | Grams |
|---|---|
| Diacetone alcohol | 200 |
| National nigrosine base N | 20 |
| Orange shellac | 80 |

The above, it will be noted, comprises a solvent for either cellulose nitrate or acetate, e. g. diacetone alcohol, a dye, and a thickener, e. g. shellac. Any good nigrosine base may be substituted for the black one given. Blue ink can be made by the use of any of the spirit blues, and green by the use of malachite green or diamond green. Other suitable gums may be substituted for the shellac. The diacetone alcohol, boiling point about 160° C., represents a good cellulose ester solvent (and dye solvent) which gives sufficiently rapid drying without being too highly volatile. In making up the composition, dissolve the nigrosine in the alcohol, filter, and then add the shellac. The rate of drying can be increased by an addition of methyl acetone and decreased by an addition of triacetine.

It will be evident that the proportions of the ingredients may be considerably varied from those given above. An important feature is the use of a high-boiling solvent which has a strong solvent action on the material to be marked, and at the same time is a good solvent for dyes. The boiling point of the solvent should be high, so that the ink does not dry on the printing tool, but not so high as to retard its drying rate unduly. A boiling point between 140° C. and 225° C. is most suitable, but this range is not essential. When used on the plastic the ink sets quickly, largely by absorption into the plastic. Diacetone alcohol is a solvent which peculiarly meets these requirements. Other solvents which might be used are ethyl lactate, and diethylene glycol.

I claim:

1. Ink for cellulose ester bodies comprising a cellulose ester solvent having a boiling point substantially between 140° C. and 225° C., a nigrosine base soluble therein, and a thickener.

2. Ink for cellulose ester bodies composed of diacetone alcohol, a dye soluble therein, and shellac.

3. Ink for cellulose ester bodies composed of ethyl lactate, a dye soluble therein, and shellac.

4. Ink for cellulose ester bodies composed of diethylene glycol, a dye soluble therein, and shellac.

In testimony whereof, I affix my signature.

JOHN H. CLEWELL.